(12) United States Patent
Chowdhury

(10) Patent No.: US 12,499,480 B2
(45) Date of Patent: Dec. 16, 2025

(54) ENABLING ORDERING THROUGH A CLIENT APPLICATION THROUGH TEXT MESSAGES WHEN A CLIENT DEVICE LACKS A DATA CONNECTION TO A NETWORK

(71) Applicant: Maplebear Inc., San Francisco, CA (US)

(72) Inventor: Muhammad Iftekher Chowdhury, Hamilton (CA)

(73) Assignee: Maplebear Inc., San Francisco, CA (US)

( * ) Notice: Subject to any disclaimer, the term of this patent is extended or adjusted under 35 U.S.C. 154(b) by 263 days.

(21) Appl. No.: 18/217,337

(22) Filed: Jun. 30, 2023

(65) Prior Publication Data

US 2025/0005650 A1 Jan. 2, 2025

(51) Int. Cl.
*G06Q 30/0601* (2023.01)
*H04L 51/046* (2022.01)

(52) U.S. Cl.
CPC ..... *G06Q 30/0633* (2013.01); *G06Q 30/0641* (2013.01); *H04L 51/046* (2013.01)

(58) Field of Classification Search
CPC .............. G06Q 30/0633; G06Q 30/0641
See application file for complete search history.

(56) References Cited

U.S. PATENT DOCUMENTS

| 2009/0171679 | A1* | 7/2009 | Salgado | G06Q 30/0281 705/346 |
| 2011/0225141 | A1* | 9/2011 | Chaudhry | G06F 11/1469 707/827 |
| 2017/0148090 | A1* | 5/2017 | Davi | G06Q 30/06 |
| 2020/0184530 | A1* | 6/2020 | Anderson | B33Y 50/00 |
| 2022/0230223 | A1* | 7/2022 | Jones | G06F 9/451 |
| 2023/0306391 | A1* | 9/2023 | Medley | G06Q 20/12 |

OTHER PUBLICATIONS

M-commerce: the role of SMS text messages. R Rettie, M Brum. Proceedings from E-Commerce to M-Commerce, 2001—academia.edu (Year: 2001).*

* cited by examiner

*Primary Examiner* — Michael Misiaszek
(74) *Attorney, Agent, or Firm* — Fenwick & West LLP

(57) ABSTRACT

An online concierge system provides a client application executed on a client device for customers to generate orders for fulfillment by the online concierge system. If the client device is unable to establish a data connection to a network, the client application locally caches data on the client device for one or more retailers that includes items that have been previously purchased by the customer or that are popular among customers. The customer generates an order through the client application for a retailer based on the locally cached items for the retailer. The online concierge system application generates an encrypted text message based on the order that is transmitted to the online concierge system via short message service (SMS). The online concierge system may also return messages via SMS, which may be presented by the client application.

20 Claims, 5 Drawing Sheets

ENABLING ORDERING THROUGH A CLIENT APPLICATION THROUGH TEXT MESSAGES WHEN A CLIENT DEVICE LACKS A DATA CONNECTION TO A NETWORK

BACKGROUND

Online concierge systems receive orders for items from customers and provide an order to a picker (or a shopper), who fulfills the order. To fulfill an order, the online concierge system allocates the order to the picker, who obtains items in an order from a retailer. The picker subsequently delivers the obtained items to a customer.

Many customers generate orders for an online concierge system through a client application executing on a client device, such as a mobile device or a laptop computer. Through a data connection to a network, the client device transmits an order from a customer to the online concierge system, which identifies the order to one or more pickers for fulfillment. However, the data connection between the client device and the online concierge system may be unavailable. For example, the client device is unable to establish a data connection to a network. As another example, a portion of the network maintaining the data connection is unavailable or is inaccessible. For conventional online concierge systems and corresponding client applications, an inability to establish a data connection prevents the online concierge system from receiving an order from a client device. Further, without a data connection, the client application on a client device cannot obtain data from the online concierge system identifying various items offered by a retailer, preventing the client application from displaying items offered by a retailer to a customer.

SUMMARY

In accordance with one or more aspects of the disclosure, a customer client device is communicatively coupled to an online concierge system through a network. The customer client device maintains different types of connections with the network. In various embodiments, the customer client device maintains a data connection to the network and an alternative connection to the network. In various embodiments, any number of alternative connections may be maintained between the customer client device and the network. Different alternative connections may transmit data having different formats or transmit data using different protocols. The data connection and the alternative connection use different protocols for transmitting data between the customer client device or may transmit data having different formats in various embodiments. For example, the data connection transmits audio data, text data, or other data, while the alternative connection transmits only text data. For example, the alternative connection is a short message service (SMS) connection. Maintaining the data connection and the alternative connection provides the customer client device with redundancy for exchanging data with the network.

The data connection between the customer client device and the network may be unavailable at times. For example, a portion of the network implementing the data connection is inoperative, making the data connection unavailable. During conventional operation, a client application associated with the online concierge system and executing on the customer client device exchanges data with the online concierge system via the data connection and the network. To enable communication between the customer client device and the online concierge system when the data connection is unavailable, the client application determines when the data connection is unavailable. In various embodiments, the client application modifies a stored value of a status indicator based on availability of the data connection. The status indicator has a first value when the data connection is available and has a second, different, value when the data connection is unavailable. Thus, the status indicator identifies to the client application whether data is capable of being transmitted using the data connection.

The client application receives a request from the customer to generate an order for fulfillment by the online concierge system. The request includes an identifier of a retailer from which the order is to be fulfilled. When the request to generate the order is received while the data connection is unavailable, the client application retrieves a locally-stored set of items offered by the retailer from a data cache of the client device. While the data connection was available, the online concierge system transmits a set of items associated with each of one or more retailers to the customer client device, which locally stores the set of items for each of the one or more retailers. In various embodiments, the online concierge system transmits sets of items for various retailers to the customer client device when the client application is initially installed on the customer client device or transmits sets of items for various retailers in response to receiving information from the client application initially identifying the customer.

For a retailer, the online concierge system selects items for inclusion in a set based on items included in prior orders fulfilled from the retailer, and may account for items included in orders previously received from the customer of the customer client device that were fulfilled from the retailer. The online concierge system selects different sets of items for different retailers and transmits a set of items selected for each of one or more retailers to the customer client device through the network and the data connection during a time when the data connection is available. In various embodiments, the client application transmits a location of the customer client device or a location associated with the customer to the online concierge system when the client application is installed on the customer client device, and the online concierge system selects the one or more retailers based on the location. For example, the online concierge system selects retailers within a threshold distance of the location and transmits a set of items for each of the selected retailers to the customer client device. The customer client device locally stores each of the sets of items in association with an identifier of a corresponding retailer. Locally storing a set of items associated with each of one or more retailers on the customer client device allows the client application to identify some items offered by a retailer of the one or more retailers when the data connection is unavailable.

From the locally-stored set of items associated with the retailer identified by the request, the client application generates one or more ordering interfaces identifying items of the stored set of items. Through interaction with the one or more ordering interfaces, the customer specifies items for inclusion in the order. For example, an ordering interface displays items of the set associated with the retailer, and the customer selects items displayed by the ordering interface for inclusion in the order. Because the stored set of items includes a limited number of items offered by the retailer, an ordering interface allows the customer to provide a text description of an item that is included in the order, with the online concierge system determining an item corresponding to the text description when receiving the order. In some embodiments, the client application generates a text message including the text description that is transmitted to the online concierge system via the alternative connection to the network and receives information describing one or more additional items having attributes that at least partially match the text description. The client application stores the information describing the one or more additional items in the set of items associated with the retailer and displays the information describing the one or more items in an ordering interface for selection by the customer. Generating one or more ordering interfaces from locally-stored sets of items allows the customer to select items for an order using the client application when the customer client device is unable to access the online concierge system through the data connection.

Based on selections of items from one or more ordering interfaces or text descriptions of one or more items, the client application generates an order for fulfillment by the retailer. The order includes an identifier of the customer, an identifier of the location for delivering items, information describing one or more items (e.g., item identifiers, text descriptions of items), and an identifier of payment information for the order. To transmit the order to the online concierge system without the data connection, the client application generates a text message including the order information from the generated order. In various embodiments, the text message is limited to including text information. The text message includes different fields in some embodiments, with different fields including different information (e.g., a customer field includes the identifier of the customer, a payment field includes the payment identifier, an item field includes information identifying an item, etc.). In some embodiments, the text message includes a tag corresponding to different information describing the order to identify different information about the order in the text message.

To maintain privacy of the customer's order, the client application encrypts the text message using encryption data previously received from the online concierge system and stored on the customer client device. For example, the online concierge system transmits encryption data, such as an online concierge system public key associated with the online concierge system (for which the online concierge system locally maintains a corresponding online concierge system public key), to the customer client device in conjunction with the sets of items associated with the one or more retailers via the data connection when the data connection is available. In other embodiments, the online concierge system transmits the encryption data to the customer client device at another time when the data connection is available. The client application locally stores the encryption data for subsequent use in encrypting text messages generated by the client application. Additionally, the customer client device locally generates a customer client device private key and a corresponding customer client device public key, and the customer client device transmits the customer client device public key to the online concierge system through the data connection. The online concierge system stores the customer client device public key in association with an identifier of the customer client device or an identifier of the customer. In various embodiments, the customer client device encrypts the text message using the online concierge system public key.

The client application transmits the encrypted text message including the order information from the customer client device to the online concierge system using the alternative connection between the customer client device and the network. As the alternative connection transmits data using a different protocol or having a different format than the data connection, the alternative connection is available for communication while the data connection is unavailable. For example, the alternative connection is a short message service (SMS) connection to the network that is limited to transmitting text data. This allows text data describing the order generated through the client application to be communicated to the online concierge system when the data connection is unavailable. Such embodiments allow the customer of the client device to continue using the client application and to place orders with the online concierge system when the client application is unable to use the data connection.

When the online concierge system receives the encrypted text message via the network, the online concierge system decrypts the encrypted text message using encryption data. For example, the online concierge system decrypts the encrypted text message using the online concierge system private key associated with the online concierge system to decrypt encryption performed by the customer client device using the online concierge system public key that was previously shared with the customer client device. After decrypting the encrypted text message, the online concierge system extracts order information from the text message and generates an order for display to one or more pickers. For example, the online concierge system identifies data from the text message in different fields or associated with different texts as different components of the order.

DETAILED DESCRIPTION

Figure 1:
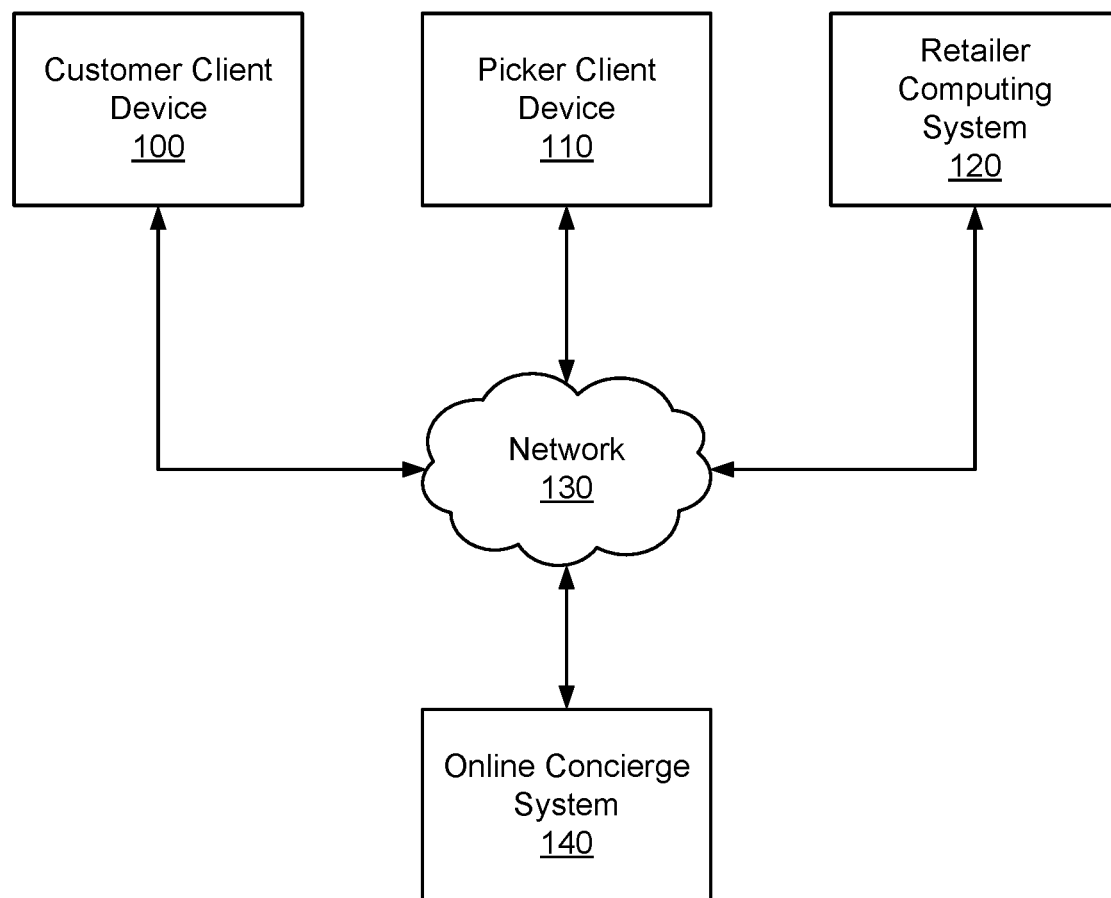
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

As further described below in conjunction with FIG. 3, the customer client device 100 executes a client application associated with the online concierge system 140. The client application comprises instructions that, when executed by a processor of the customer client device 100, display one or more interfaces to the customer via the customer client device 100. Additionally, the client application exchanges data between the customer client device 100 and the online concierge system 140 through connections to one or more networks. As further described below in conjunction with FIGS. 3-5, the client application receives inputs from the customer and generates an order for fulfillment by one or more pickers based on the received inputs. The client application transmits the generated order, or information describing the generated order, to the online concierge system 140.

In various embodiments, the client application exchanges data with the online concierge system 140 through a data connection established between the customer client device 100 and the network 130. In response to detecting the data connection between the customer client device 100 and the network 130 is unavailable, to allow the customer to place an order for fulfillment by the online concierge system 140, the client application generates a text message describing the order based on inputs from the user and transmits the text message using an alternative connection to the network than the data connection. The client application receives selections of items from the customer and generates the text message including information describing the order based on the selected items, as further described below in conjunction with FIGS. 3-5. The client application transmits the text message describing the order through an alternative connection, separate from the data connection, between the customer client device 100 and the network 130. For example, the client application transmits the text message describing the order to the online concierge system through a short message service (SMS) channel, allowing communication between the client application and the online concierge system 140 when the data connection is unavailable to the customer client device 100. As further described below in conjunction with FIGS. 3-5, the client application may receive information about an order transmitted via text message to the online concierge system 140 through the alternative connection with the network 130 used to transmit the text message and display the received information to the customer, providing the customer with information about fulfillment of the order when the customer client device 100 is unable to establish a data connection.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

In various embodiments, the network 130 supports different communication channels with a client device (e.g., the customer client device 100), allowing the client device to establish connections with the network 130 using different communication protocols. For example, a client device may establish a data connection with the network 130 and a separate short message service (SMS) connection with the network 130, with different types of data transmitted or received through the different channels. In various embodiments, a client device has multiple connections to the network 130, with different connections transmitting data using different protocols or transmitting data using different formats.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
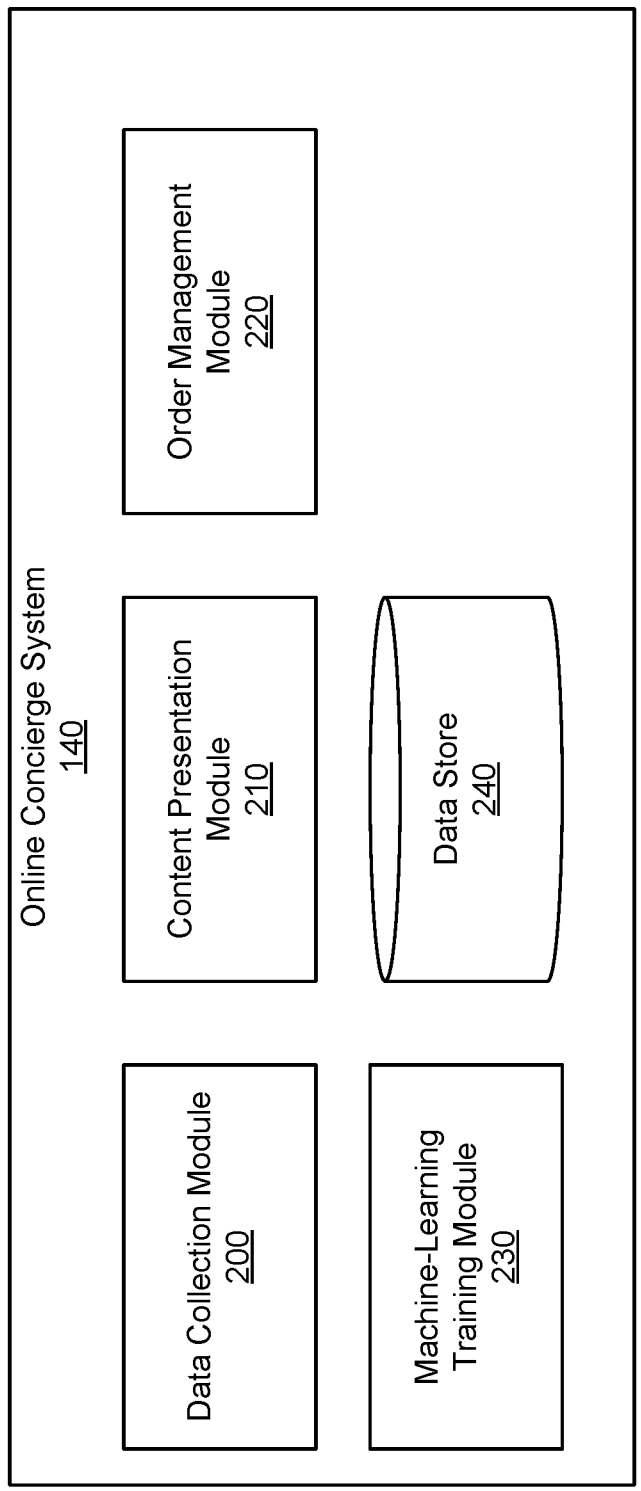
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The content presentation module 210 may select a set of items for a retailer that is transmitted from the online concierge system 140 to a customer client device 100, which locally stores the set of items in association with a retailer. In some embodiments, the content presentation module receives an identifier of a customer and a location of a customer and selects one or more retailers within a threshold distance of the location. For each selected retailer, the content presentation module 210 selects a set of items based on prior orders fulfilled from the retailer. In some embodiments, the content presentation module 210 selects items for a set based on items included in prior orders from the customer fulfilled from the retailer (e.g., items included in a threshold number of orders from the customer, items included in prior orders from the customer with at least a threshold frequency). Alternatively, the content presentation module 210 selects items for a set based on items included in prior orders fulfilled from the retailer received from multiple users (e.g., global users, users associated with locations within a threshold distance of the location). The content presentation module may account for categories associated with items when selecting a set of items for a retailer, so the set includes at least a threshold number of items associated with each of at least a set of the categories. As further described below in conjunction with FIGS. 3-5, the online concierge system 140 transmits a set of items for each of one or more selected retailers to a customer client device 100, which locally stores the sets of items in association with corresponding retailers for subsequent access.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 trains and maintains one or more large language models. A large language model receives unstructured text as input and generates one or more outputs based on the unstructured text. For example, a large language model is trained to receive a text message from a customer client device 100 and to output one or more items from an item catalog based on the text message. As another example, a large language model is trained to receive a text message from a customer client device 100 and to generate a response to the text message, with the response comprising natural language text that is transmitted to the client device. In various embodiments, different large language models are trained to generate different types of outputs based on received natural language text inputs. One or more large language models trained by the machine learning training module 230 may be generative pre-trained transformer models (GPTs) in various embodiments.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
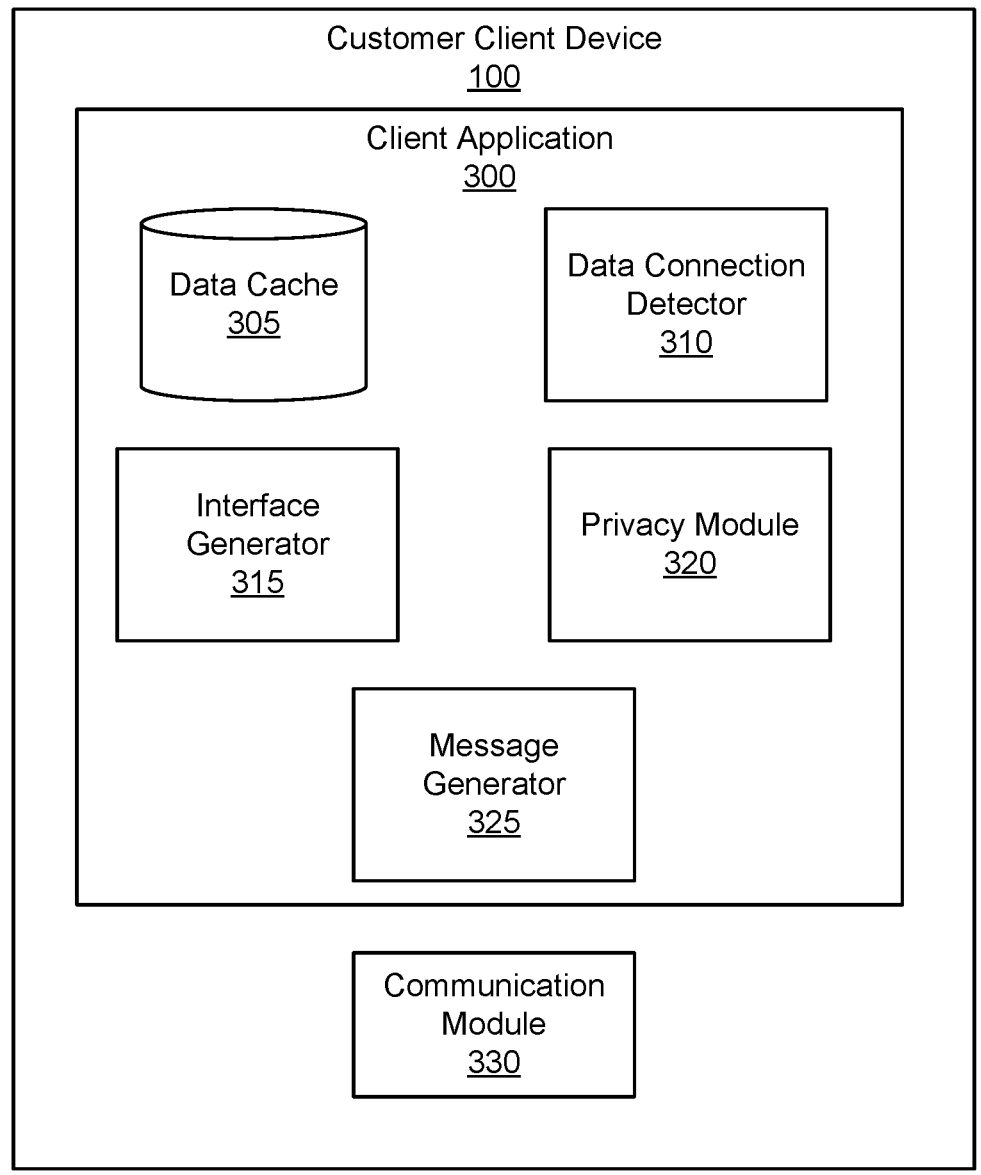
FIG. 3 is a block diagram of a system architecture of a client application associated with an online concierge system, in accordance with one or more embodiments.

FIG. 3 is a block diagram of an example system architecture of a client application 300 executing on a customer client device 100. The client application 300 is associated with the online concierge system 140 and exchanges data with the online concierge system 140 via a network 130 coupled to the online concierge system 140 and to the customer client device 100. In the system architecture illustrated in FIG. 3, the client application 300 includes a data cache 305, a data connection detector 310, an interface generator 315, a privacy module 320, and a message generator 325. Additionally, as shown in FIG. 3, the customer client device 100 includes a communication module 330. Alternative embodiments may include more, fewer, or different components from those illustrated in FIG. 3, and the functionality of each component may be divided between the components differently from the description below. Additionally, each component may perform their respective functionalities in response to a request from a human, or automatically without human intervention.

The data cache 305 is a non-transitory computer readable storage medium on the customer client device 100 on which a set of items for a retailer received from the online concierge system 140 is stored. This allows the customer client device 100 to locally maintain data identifying items offered by one or more retailers. In some embodiments, the data cache 305 receives a set of items associated with each of a set of retailers. In the preceding example, different sets of items may be associated with different retailers, allowing the data cache 305 to maintain different sets of items for different retailers.

In various embodiments, the online concierge system 140 selects a set of items for a retailer stored by the data cache 305 based on prior orders fulfilled from the retailer. For example, the online concierge system 140 identifies a retailer and ranks items available from the retailer based on previously fulfilled orders from the retailer. For example, the online concierge system 140 ranks items offered by the retailer based on a frequency with which different items were included in prior orders fulfilled by the retailer or based on a number of prior orders fulfilled by the retailer that included different items. Items more frequently included in prior orders (or included in a greater number of prior orders) have higher positions in the ranking, and the online concierge system 140 selects items having at least a threshold position in the ranking as the set of items for the retailer. The online concierge system 140 transmits information describing each item of the set and an identifier of the retailer to the client application 300, which stores the set of items in association with the identifier of the retailer in the data cache 305. In various embodiments, when transmitting the set of items to the client application 300, the online concierge system 140 transmits an item identifier for each item of the set and text information describing each item of the set in association with a corresponding item identifier. The online concierge system 140 transmits an image corresponding to each item identifier, while in other embodiments, the online concierge system 140 does not transmit images for items of the set to reduce an amount of data stored in the data cache 305 for each item of a set.

In some embodiments, one or more items of a set stored in association with a retailer are based on prior orders the online concierge system 140 received from a customer associated with the customer client device 100. In some embodiments, the online concierge system 140 retrieves prior orders received from the customer associated with the customer client device 100 and fulfilled from the retailer. For example, the online concierge system 140 receives an identifier of the customer from the customer client device 100 while a data connection between the customer client device 100 is available. By retrieving prior orders associated with the identifier of the customer, the online concierge system 140 identifies one or more items from the prior orders fulfilled for the user from the retailer for inclusion in the set of items associated with the retailer. For example, the set of items for the retailer includes items that were included in at least a threshold number of orders fulfilled from the retailer for the customer or that were included in orders fulfilled from the retailer for the customer with at least a threshold frequency. Retrieving prior orders from the customer fulfilled by the retailer allows the data cache 305 to locally store items previously included in orders from the retailer received from the customer. Locally storing data describing sets of items for various retailers in the data cache 305 allows the client application 300 to retrieve information describing a set of items offered by a retailer when the customer client device 100 is unable to establish a data connection for communicating with the online concierge system 140.

The data connection detector 310 determines whether a data connection between the customer client device 100 and the network 130 is available. The data connection exchanges data between the client application 300 and one or more other applications executing on the customer client device 100 with a server (e.g., the online concierge system 140) via a network 130. For example, the client application 300 transmits data to the online concierge system 140 and receives data from the online concierge system 140 through a data connection between the customer client device 100 and the network 130 when the data connection detector 310 determines the data connection is available. However, the customer client device 100 may be unable to establish a data connection with the network 130. For example, when a portion of the network 130 supporting the data connection is inoperable or is inaccessible, the customer client device 100 is unable to establish a data connection with the network.

The data connection detector 310 receives information from an application programming interface (API) of the customer client device 100 describing a status of the data connection, and determines whether the data connection is available based on the received information in some embodiments. For example, the data connection detector 310 receives a flag from the API of the customer client device 100 having a specific value when the data connection is available and having an alternative value when the data connection is not available. In other embodiments, the data connection detector 310 transmits a request for data from the online concierge system 140 using the data connection and determines the data connection is unavailable in response to not receiving a response to the request from the online concierge system 140 (e.g., not receiving a response within a threshold amount of time from a time when the request was sent). The data connection detector 310 stores a status indicator having a particular value when the data connection is available and having an alternative, different, value when the data connection is not available.

The interface generator 315 generates one or more interfaces for display to the customer through a display device of the customer client device 100 and receives input from customer interaction with one or more of the interfaces. For example, the interface generator 315 generates an ordering interface displaying items offered by a retailer selected by the customer. Through interactions with the ordering interface, the customer using the customer client device 100 selects items for inclusion in an order to be fulfilled by the retailer. The interface generator 315 retrieves data identifying items offered by a retailer from the online concierge system 140 or from the data cache 305 based on the status indicator from the data connection detector 310. In response to the status indicator indicating the data connection is available, the interface generator 315 transmits an identifier of a retailer to the online concierge system 140 and receives information describing items offered by the retailer corresponding to the identifier. From the received information, the interface generator 315 generates the ordering interface identifying one or more items offered by the retailer.

However, in response to the status identifier from the data connection detector 310 indicating the data connection is unavailable, the interface generator 315 retrieves information describing the set of items associated with the retailer identified by the customer from the data cache 305. When the data connection is unavailable, the interface generator 315 generates the ordering interface for a retailer based on locally stored information from the data cache 305 that describes a set of items associated with the retailer. This allows the ordering interface to identify a set of items to the customer even when the customer client device 100 lacks a data connection for exchanging data with the online concierge system 140. Although the data cache 305 includes data describing a limited number of items offered by the retailer, retrieving information from the data cache 305 allows the interface generator 315 to generate an ordering interface for a retailer allowing order generation while the data connection is unavailable.

In some embodiments, one or more ordering interfaces generated by the interface generator 315 are natural language interfaces. In a natural language interface, the client application 300 receives natural language text, which is unstructured text, from the customer. The interface generator 315 applies one or more large language models stored on the customer client device 100 to the natural language text that identifies items based on the natural language text. For example, a large language model on the customer client device 100 identifies one or more items from a locally stored set of items based on the natural language text. The ordering interface subsequently displays text or image content corresponding to the identified one or more items to the customer. Alternatively, a natural language interface receives natural language text from the customer and generates a text message including the natural language text. The text message is subsequently transmitted to the online concierge system 140, where one or more large language models extract order information from the natural language text, as further described below in conjunction with FIG. 3. Hence, a natural language interface may allow a customer to generate a natural language text message including order information (e.g., one or more items, a retailer from when the one or more items are obtained) that one or more large language models maintained by the online concierge system 140 extract from the natural language text message.

When using data from the data cache 305, the interface generator 315 configures the ordering interface to receive text input from the customer that is included in an order. The text input from the customer describes or identifies an item for inclusion in the order, allowing the customer to identify an item that is not included in the set of items stored by the data cache 305 for an order. Without a data connection, the interface generator 315 is limited to displaying information about the set of items stored in the data cache 305 that the retailer offers, so the ordering interface allows the customer to provide text information identifying one or more items offered by the retailer that are not locally-stored in the data cache 305.

In some embodiments, the client application 300 transmits text information received via the ordering interface and an identifier of the retailer to the online concierge system 140 via an alternative connection that is different from the data connection, as further described above in conjunction with FIG. 2, before the customer completes the order. For example, the client application 300 transmits a text message including the text information through a short message service (SMS) connection between the customer client device 100 and the network 130. The online concierge system 140 selects one or more additional items from the retailer having attributes that at least partially match the text information and transmits text information describing each of the one or more additional items to the customer client device 100 through the alternative channel (e.g., via text messages through the SMS connection). The client application 100 updates the data cache 305 to store information describing the one or more additional items in association with the retailer. With information describing the additional items stored in the data cache 305, the interface generator 315 updates one or more ordering interfaces to display information describing the additional items, simplifying subsequent selection of the additional items by the customer and updating that data cache 305 to increase a number of items relevant to the customer that are locally stored.

The privacy module 320 stores information for encrypting messages transmitted by the client application 300 via an alternative connection other than the data connection and for decrypting messages the client application 300 receives via the alternative connection other than the data channel. In various embodiments, the online concierge system 140 provides an online concierge system public key to the client application 300 when the client application 300 is installed on the customer client device 100. The privacy module 320 stores the online concierge system public key for the online concierge system 140. In various embodiments, the online concierge system public key associated with the online concierge system 140 or other encryption information is transmitted to the customer client device 100 via the data connection while the data connection is available. Additionally, the privacy module 320 determines a customer client device private key that is specific to the customer and stores the private key in association with the customer, and transmits a corresponding customer client device public key to the online concierge system 140 via the data connection, while the data connection is available. The privacy module 320 encrypts a message to the online concierge system 140 from the client application 300 using the online concierge system public key and transmits the encrypted message using the alternative connection other than the data connection.

In various embodiments, the customer client device 100 receives an encrypted message from the online concierge system 140 via the alternative connection other than the data connection. The privacy module 320 decrypts the encrypted message from the online concierge system 140, with the interface generator 315 displaying content from messages from the online concierge system 140 after being decrypted. In various embodiments, the privacy module 320 uses the private key of the customer to decrypt a message from the online concierge system 140. In other embodiments, the privacy module 320 uses other data associated with the customer or associated with the online concierge system 140 to decrypt an encrypted message received from the online concierge system 140.

The message generator 325 generates a text message describing the order based on information about the order received from the interface generator 315. The message generated by the message generator 325 includes an identifier of the customer, an identifier of a location where items of the order are to be delivered, an identifier of the retailer from which items are obtained, and information describing each item selected by the customer. In various embodiments, the message includes payment information or an identifier of payment information specified by the customer. In various embodiments, the text message has a specific structure maintained by the message generator 315. For example, the message includes different fields, with each field corresponding to a different type of information in various embodiments and the message generator 315 identifying which information is included in which field.

In various embodiments, the message generator 325 stores a type indicator in association with information identifying different items, with the type indicator indicating whether the information identifying an item is an item identifier or is text data from the customer. For example, the type indicator has a first value when information identifying an item is an item identifier retrieved from the data cache 305 and has a second value when information identifying the item is text data received from the customer. Including the type indicator in association with information identifying each item allows the online concierge system 140 to differentiate how items from the message are identified to a picker based on whether the customer selected the item from an ordering interface or provided text describing an item.

The privacy module 320 receives the text message generated based on the order from the message generator 325 and generates an encrypted message by encrypting the content of the text message. In various embodiments, the privacy module 320 encrypts the text message using a public key, or other information, associated with the online concierge system 140. The customer client device 100 transmits the encrypted message to the online concierge system 140 via the alternative connection other than the data connection with the network 130.

Additionally, the customer client device 100 includes a communication module 330 that establishes and maintains one or more connections with a network 130. In various embodiments, the communication module 330 establishes a data connection with the network, with the data connection supporting transmission and receipt of image data, video data, audio data, and text data. Additionally, the communication module 330 establishes and maintains an alternative connection with the network 130, with the alternative connection using a different communication format than the data connection or transmitting data having a different format than used by the data connection. For example, the alternative connection is a short message service connection limited to transmitting and to receiving text data via the network 130. In various embodiments, the communication module 330 maintains multiple connections to the network 130, with different connections transmitting data using different protocols or transmitting data having different formats. Maintaining multiple connections having different types with the network 130 allows the communication module 330 to provide redundancy for transmission or receipt of data by the customer client device 100 via the network 130. In various embodiments, the data connection detector 310 of the client application 300 receives information from the communication module 300 indicating whether the data connection is available or is unavailable.

Figure 4:
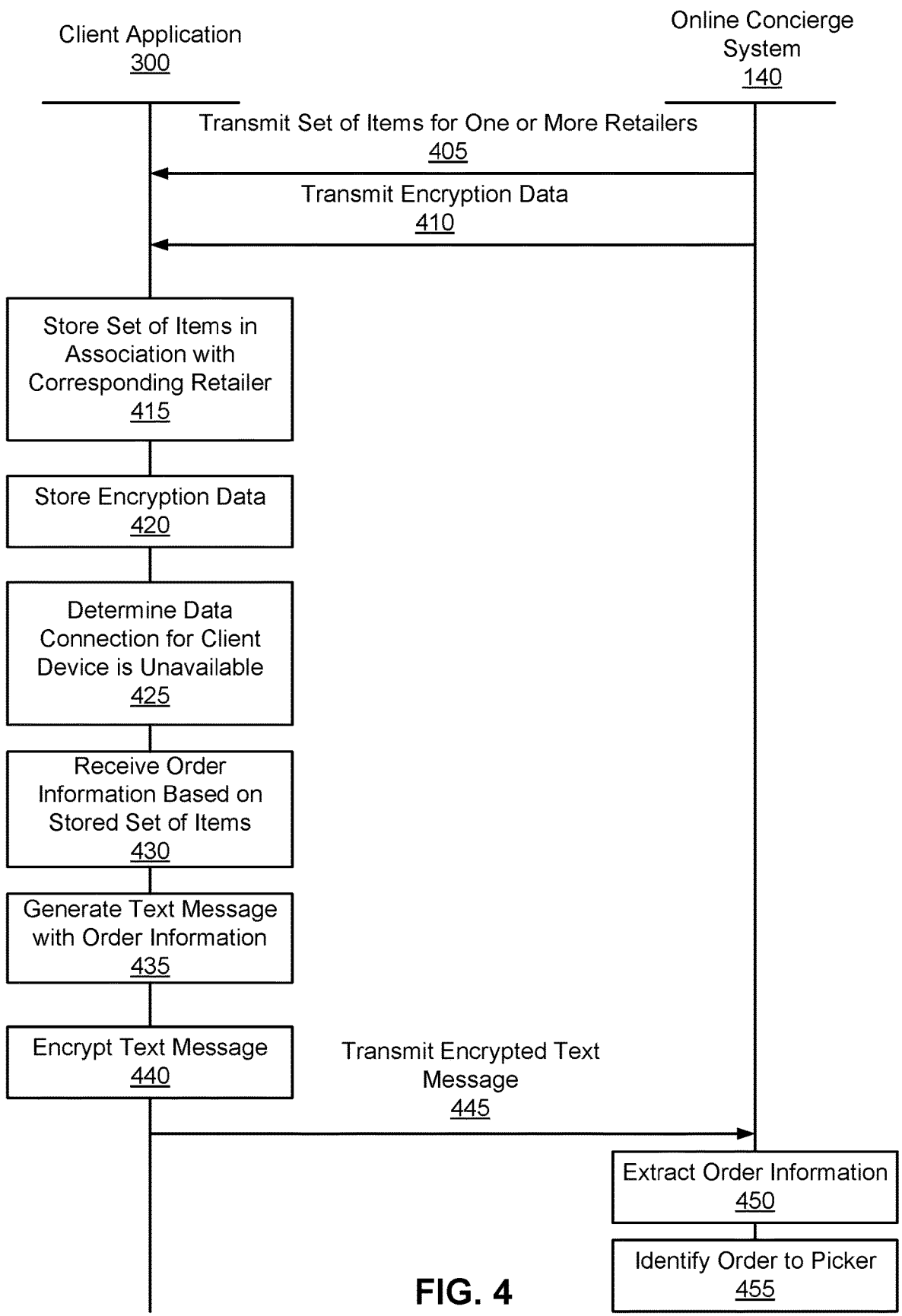
FIG. 4 is an interaction diagram of a method for transmitting information for an order to an online concierge system when a data connection to the online concierge system is unavailable, in accordance with one or more embodiments.

FIG. 4 is an interaction diagram of a method for transmitting information for an order to an online concierge system 140 when a data connection to the online concierge system 140 is unavailable, in accordance with some embodiments. Alternative embodiments may include more, fewer, or different steps from those illustrated in FIG. 4, and the steps may be performed in a different order from that illustrated in FIG. 4. These steps may be performed by an online concierge system (e.g., online concierge system 140) and a client application 300 executing on a customer client device 100. Additionally, one or more of these steps may be performed automatically by the online concierge system 140 or by the client application 300 without human intervention in some embodiments.

To allow customers to place orders for fulfillment through an online concierge system 140, a customer installs a client application 300 associated with the online concierge system 140 on a customer client device 100. Examples of customer client devices 100 include a mobile device, a laptop, or another computing device. The client application 300 receives inputs from the customer through the customer client device 100 and exchanges data with the online concierge system 140 through a network 130 coupled to the customer client device 100 and to the online concierge system 140. In various embodiments, the customer client device 100 establishes a data connection between the customer client device 100 and the network 130 and exchanges data with the online concierge system 140 through the data connection.

As the data connection between the customer client device 100 and the network 130 may be lost or be unavailable at times, the online concierge system 140 transmits 405 a set of items for each of one or more retailers offering items to the customer client device 100 and transmits 410 encryption data to the customer client device 100. The sets of items and the encryption data are transmitted using the data connection while the data connection is available in various embodiments. The online concierge system 140 receives a customer identifier of the customer associated with the customer client device 100 from the customer client device 100. For example, the client application 300 transmits information identifying the customer and identifying a location to the online concierge system 140 in response to receiving one or more inputs from the customer or in response to the customer performing one or more actions. In various embodiments, the online concierge system 140 identifies one or more retailers within a threshold distance of the location received from the customer client device 100.

For each of the identified retailers, the online concierge system 140 selects a set of items, as further described above in conjunction with FIG. 2. For example, the online concierge system 140 ranks items offered by an identified retailer based on a frequency with which the items were included in orders fulfilled from the retailer within a time interval or based on a number of orders fulfilled from the retailer within the time interval including different items. The online concierge system 140 selects items having at least a threshold position in the ranking for inclusion in the set and transmits 405 the set of items selected for an identified retailer to the customer client device 100 through the network 130 and the data connection. In some embodiments, the online concierge system 140 retrieves a history of orders the online concierge system 140 previously fulfilled for the customer identified by the customer client device 100 from an identified retailer and selects one or more items for the set for the identified retailer based on a frequency of orders fulfilled for the customer from the retailer including the items or based on a number of orders fulfilled for the customer from the retailer that include the items.

Further, the online concierge system 140 may account for categories associated with items offered by an identified retailer when selecting a set of items for the retailer. In some embodiments, the online concierge system 140 selects a set of items for a retailer so the set includes at least a threshold number of items associated with each of a set of categories. The set of categories may be determined based on a frequency with which customers or with which the customer associated with the customer client device 100 includes items from various categories in orders. For example, the set of categories includes categories associated with items included in at least a threshold number of prior orders or included in prior orders with at least a threshold frequency (the prior orders may be prior orders from the customer or from multiple customers). Leveraging prior orders from the customer allows the online concierge system 140 to select a set of items for a retailer that are tailored to the customer associated with the client application 300.

The encryption data received by the customer client device 100 includes data for encrypting messages or other data the customer client device 100 transmits to the online concierge system 140. Similarly, the encryption data includes data for the client application 300 to decrypt data received from the online concierge system 140. For example, the online concierge system 140 transmits 410 an online concierge system public key associated with the online concierge system 140 to the customer client device 100, while the online concierge system 140 locally maintains a corresponding online concierge system private key. The client application 300 stores the online concierge system public key for subsequent use in encrypting data transmitted from the customer client device 100 to the online concierge system 140.

In response to receiving the set of items for each of one or more retailers, the client application 300 stores 415 the set of items in association with a corresponding retailer at the customer client device 100. For example, the client application 300 stores the set of items associated with each retailer in a data cache 305 stored on the customer client device 100, as further described above in conjunction with FIG. 2. In various embodiments, the data cache 305 includes a stored set of items associated with an identifier of a corresponding retailer, allowing retrieval of a set of items for a retailer based on the identifier of the retailer.

The client application 300 similarly stores 420 the encryption data in a non-transitory computer readable storage medium of the customer client device 100. For example, a privacy module 320 of the client application 300 stores the encryption data received from the online concierge system 140. As another example, the data cache 305 stores the encryption data from the online concierge system 140. In various embodiments, the client application 300 generates a customer client device private key associated with the customer and transmits a corresponding customer client device public key to the online concierge system 140 via the network 130 in conjunction with an identifier of the customer. The online concierge system 140 stores the customer client device public key in association with the identifier of the customer for subsequently encrypting data transmitted from the online concierge system 140 to the customer client device 100.

In various embodiments, the online concierge system 140 transmits 405 the set of items associated with the one or more retailers and transmits 410 the encryption data through a data connection between the network 130 and the customer client device 100 while the data connection is available. As further described above in conjunction with FIG. 2, in various embodiments, the customer client device 100 maintains different connections with the network 130, with different connections transmitting data or receiving data using different protocols or having different formats. The customer client device 100 maintains the data connection and one or more alternative connections with the network 130 in various embodiments, with an alternative connection transmitting and receiving data using a different protocol than the data connection (or transmitting and receiving data having a different format than the data connection). For example, an alternative connection is a short message service (SMS) connection that transmits and receives text data but not other types of data.

The client application 300 obtains data identifying availability of the data connection between the customer client device 100 and the network 130. In some embodiments, the client application 300 includes a data connection detector 310 maintaining a status indicator identifying availability of the data connection. The status indicator has a first value when the data connection to the network 130 is available and has a second, different, value when the data connection to the network 130 is unavailable. In some embodiments, the data connection detector 310 determines the value for the status identifier based on data received from a communication module 330 of the customer client device 100. Alternatively, the data connection detector 310 determines whether the data connection is available by requesting data from the online concierge system 140 via the data connection at different times. The data connection detector 310 modifies the value of status indicator based on whether a data was received in response to a request via the data connection within a threshold amount of time from a time when a request was transmitted.

In response to determining 425 the data connection is unavailable, when the client application receives a request from the customer to generate an order, the client application 300 retrieves a set of items locally stored on the customer client device 100 in association with a retailer identified by the request. Based on the retrieved set of items, the client application 300 generates and displays one or more ordering interfaces to the customer via the customer client device 100. An ordering interface displays information identifying at least some of the set of items stored on the customer client device 100 in association with the retailer. In contrast, when the data connection is available, the client application 300 transmits a request for items to the online concierge system 140 through the data connection identifying the retailer, receives items offered by retailer from the online concierge system 140, and displays the items offered by the retailer from the online concierge system 140 in one or more ordering interfaces. When the data connection is unavailable, the client application 300 does not retrieve items offered by a retailer identified by the customer from the online concierge system 140, but retrieves locally-stored information identifying a set of items offered by the identified retailer.

From the one or more ordering interfaces based on the locally stored information identifying items offered by the retailer, the client application 300 receives 430 information for the order. Information for the order includes selections of items offered by the retailer, such as selection of an item offered by the retailer from an ordering interface. For example, an input with the ordering interface selects an item identified by the ordering interface for inclusion in the order, and the client application 300 stores an item identifier of the selected item in association with the order.

However, the set of items offered by the retailer stored by the customer client device 100 includes less than a complete catalog of items offered by the retailer, so the ordering interface displays a limited number of items offered by the retailer. To allow the customer to include items offered by the retailer that are not included in the locally stored set of items in the order, the ordering interface receives text from the customer identifying an item and includes the text description of the item in the order.

In some embodiments, the client application 300 uses text information describing an item received from a user to augment the locally-stored set of items associated with the retailer. For example, the client application 300 generates a text message requesting additional items that includes the text information describing the item received from the customer. The client application 300 transmits the text message to the online concierge system 140 via an alternative connection than the data connection. The client application 300 subsequently receives information describing one or more additional items that the online concierge system 140 selected based on the text information describing the item via the alternative connection. For example, the online concierge system 140 transmits text information corresponding to one or more additional items that at least partially match the text information describing the item received from the customer. The client application 300 stores the information corresponding to the one or more additional items in the set of items associated with the retailer maintained by the data cache 305, allowing the set of items to be augmented based on input received from the customer.

In various embodiments, one or more text messages generated by the client application 300 include natural language text and the online concierge system 140 applies one or more large language models trained to generate responses based on natural language text to a text message from the client application 300. The one or more large language models are trained to generate natural language replies or other types of replies based on natural language text. The online concierge system 150 transmits a reply generated from a large language model to the client application through an alternative connection than the data connection. The client application 300 extracts data from the reply and displays the extracted data to the customer. For example, the client application 300 extracts one or more items from the reply generated by the large language model of the online concierge system 140 and displays they one or more items to the customer and stores the set of items in the set of items, augmenting the set of items with additional items.

When generating the order, the client application 300 stores a type in association with information identifying each item included in the order. For example, a type indicates whether information identifying an item is an item identifier or is a text description of the item. This allows the customer to include items other than those locally stored in the customer client device 100 in association with the retailer in the order.

The client application 300 generates an order based on selections of items displayed by the ordering interface or text descriptions of items received from the customer. The order includes an identifier of the customer, an identifier of the location where items of the order are to be delivered, an identifier of the retailer, and information identifying each item included in the order. The order also includes an identifier of payment information of the customer used to compensate the retailer for the items in the order. The payment information is stored in association with the customer by the online concierge system 140, with the identifier of the payment information used by the online concierge system 140 to retrieve the payment information.

From the generated order, the client application 300 generates 435 a text message including the order information. The text message includes text information describing the order. In various embodiments, the text message is limited to including text data. The text message includes an identifier of the customer, an identifier of a location where items of the order are to be delivered, an identifier of the retailer from which items are obtained, and information describing each item included in the order, as well as an identifier of payment information for the order. The text message includes different fields in various embodiments, with each field corresponding to a different type of information in various embodiments. The text message includes a tag corresponding to different information describing the order, allowing differentiation of different information about the order, in various embodiments.

When generating 425 the text message, the client application includes a type indicator in association with information identifying different items, with the type indicator identifying whether the information identifying an item is an item identifier or is text data describing an item. For example, the type indicator has a first value when information identifying an item is an item identifier retrieved from the data cache 305 and has a second value when information identifying the item is text data received from the customer. Including the type indicator in association with information identifying each item allows the online concierge system 140 to modify how items included in the text message are identified to a picker based on whether the information identifying an item is an item identifier selected by the customer or is a text description of the item provided by the customer.

The client application 300 encrypts 440 the text message using the stored encryption data and transmits 445 the encrypted text message to the online concierge system 140 through an alternative connection than the data connection. For example, the client application 300 encrypts 440 the text message using a public key associated with the online concierge system 140 and stored by the client application 300. As the text message includes text information describing the order, encrypting 440 the text message prior to transmission increases the customer's privacy by preventing access to the information about the order without data for decrypting the text message. In various embodiments, the alternative connection is a short message service (SMS) connection that transmits text data, with the SMS connection using different transmission protocols than the data connection that allow the SMS connection to remain available when the data connection is unavailable.

In response to receiving the encrypted text message, the online concierge system 140 extracts 450 order information from the encrypted text message. To extract the order information, the online concierge system 140 decrypts the encrypted text message using the encryption data used to encrypt the 440 text message including the order information. For example, the online concierge system 140 decrypts the encrypted text message using a public key associated with the online concierge system 140. Decrypting the encrypted text message identifies the text data describing the order to the online concierge system 140, which extracts 450 order information from the text message. For example, the online concierge system 140 identifies different fields in the text message corresponding to different order information, and generates information describing the order from the extracted order information.

In some embodiments, the text message includes natural language text rather than different fields. To extract 450 order information from a text message including natural language text, the online concierge system 140 applies one or more large language models trained to output one or more items based on natural language text in the text message. The one or more large language models output one or more items corresponding to the natural language text, a retailer from which the one more items are to be obtained, as well as other order information from the natural language text. Similarly, one or more large language models output other order information, as further described above, based on natural language text in the text message. Hence, one or more large language models maintained by the online concierge system 140 extract 450 order information from natural language text in the text message, allowing the customer to specify an order through natural language text.

When extracting 450 order information from the text message, the online concierge system 140 selects an item based on the text description for item descriptions having a type indicator specifying the item was from text information received from the customer. In some embodiments, the online concierge system 140 retrieves one or more orders previously fulfilled for the user and selects an item from the one or more previously fulfilled orders associated with attributes that at least partially matches the text description. Such selection of an item leverages prior orders from the customer to select an item based on a text description provided by the customer. Alternatively, the online concierge system 140 generates a score for each item offered by the retailer based on an amount of attributes associated with the item at least partially matching the text description (the score may account for other information, such as number of orders from the user or from other users including an item that the online concierge system 140 previously received), and selects an item for the text description based on the score (e.g., an item having a maximum score, an item having at least a threshold score).

The online concierge system 140 identifies 455 the order to one or more pickers based on the extracted order information. For example, the online concierge system 140 displays at least a portion of the order information to one or more pickers through one or more interfaces, allowing a picker to select the order for fulfillment. In various embodiments, the online concierge system 140 transmits a confirmation message to the customer client device 100 using the alternative connection, with the confirmation message confirming the online concierge system 140 received the order. In various embodiments, the online concierge system 140 encrypts the confirmation message and transmits the encrypted confirmation message via the alternative connection. For example, the online concierge system 140 encrypts the confirmation message using the customer client device public key associated with the customer and transmits the encrypted confirmation message via the alternative connection. The client application 300 receives the encrypted confirmation message and decrypts the encrypted confirmation message using the customer client device private key corresponding to the customer client device public key. The client application 300 displays the content of the encrypted confirmation message to the customer after decryption. In other embodiments, the online concierge system 140 transmits the confirmation message to the customer client device 100 without being encrypted and the client application 300 displays the confirmation message to the customer.

In some embodiments, the online concierge system 140 transmits one or more status updates about the order to the customer client device 100 via the alternative channel. In various embodiments, each status update is limited to including text data. Example status updates include an indication the picker has selected a replacement item for an item included in the order, a request for authorization by the customer for the picker to select a replacement item for an item included in the order, an indication the picker has completed obtaining items included in the order, an indication the picker is traveling to the location identified by the order, an estimated time when the picker is to arrive at the location identified by the order, or other data describing fulfillment of the order. In various embodiments, each status message is a text message that the online concierge system 140 encrypts prior to transmission via the alternative channel, so the online concierge system 140 transmits encrypted status messages to the customer client device 100 via the alternative channel. The client application 300 decrypts an encrypted status message and displays content of a decrypted status message to the customer, providing updates to the customer about fulfillment of the order. Alternatively, each status message is unencrypted, with the client application 300 displaying content of each status message.

Figure 5:
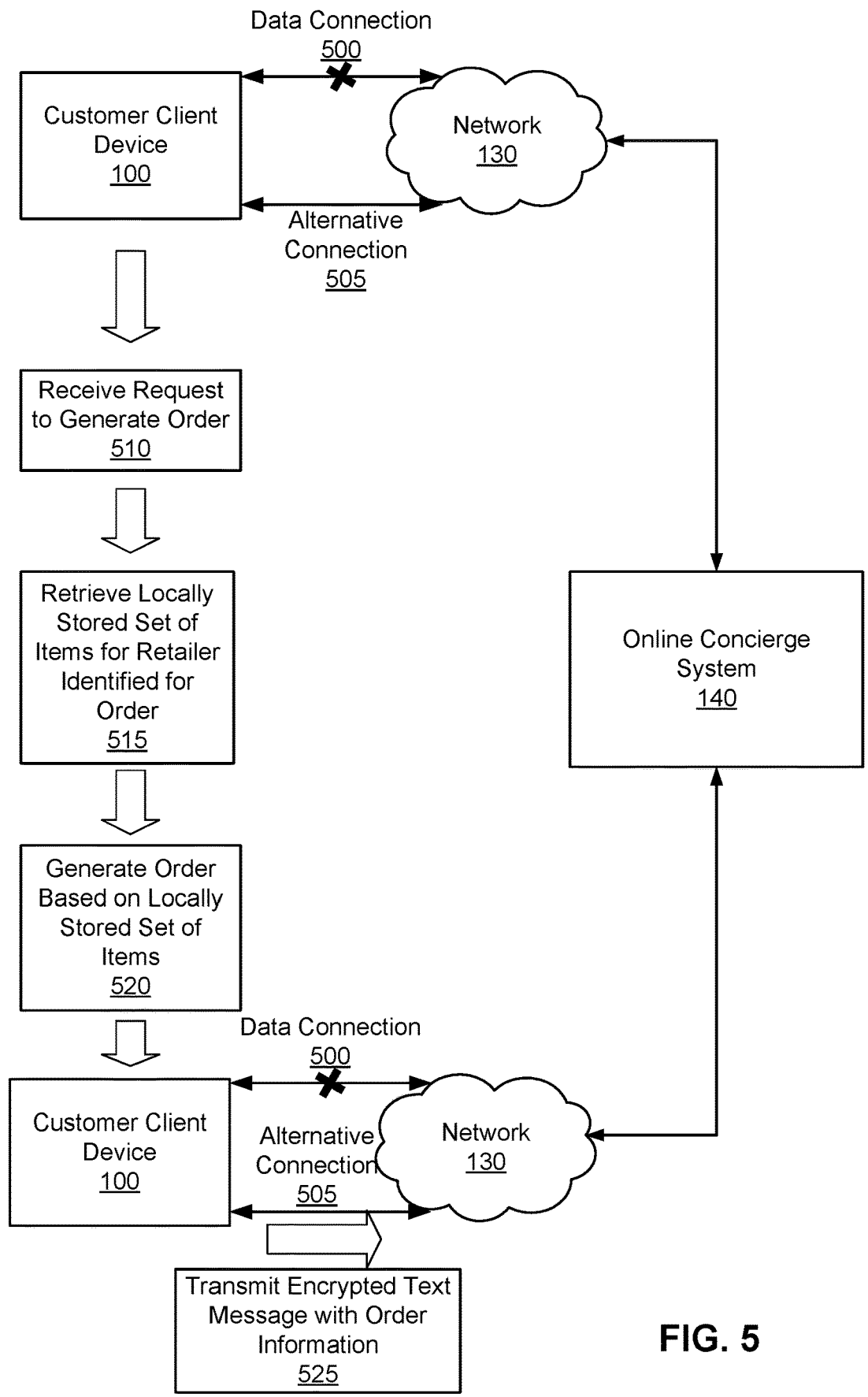
FIG. 5 is a process flow diagram of a method for transmitting information for an order to an online concierge system when a data connection to the online concierge system is unavailable, in accordance with one or more embodiments.

FIG. 5 is a process flow diagram of a method for transmitting information for an order to an online concierge system 140 when a data connection to the online concierge system 140 is unavailable. As shown in the example of FIG. 5, a customer client device 100 is communicatively coupled to the online concierge system 140 through a network 130, as further described above in conjunction with FIG. 1. The customer client device 100 maintains different types of connections with the network 130 in the example shown by FIG. 5. In various embodiments, the customer client device 100 maintains a data connection 500 to the network 130 and an alternative connection 505 to the network 130. For purposes of illustration, FIG. 5 shows a single alternative connection 505 between the customer client device 100 and the network 130, but any number of alternative connections 505 may be maintained between the customer client device 100 and the network 130 in other embodiments. The data connection 500 and the alternative connection 505 use different protocols for transmitting data between the customer client device 130 or transmit data having different formats in various embodiments. For example, the data connection 500 transmits audio data, text data, or other data, while the alternative connection 505 transmits only text data. For example, the alternative connection 505 is a short message service (SMS) connection. Maintaining the data connection 505 and the alternative connection 505 provides redundancy for the customer client device 100 exchanging data with the network 130.

In the example of FIG. 5, the data connection 500 between the customer client device 100 and the network 130 is unavailable. For example, a portion of the network 130 implementing the data connection 500 is inoperative. During conventional operation, a client application 300 associated with the online concierge system 140 and executing on the customer client device 100 exchanges data with the online concierge system 140 via the data connection 500 and the network 130. To enable communication between the customer client device 100 and the online concierge system 140 when the data connection 500 is unavailable, the client application 300 determines the data connection 500 is unavailable, as further described above in conjunction with FIGS. 3 and 4. As further described above in conjunction with FIGS. 3 and 4, in various embodiments, the client application 300 modifies a value of a status indicator based on availability of the data connection 500. In the example of FIG. 5, the client application 300 stores a value for the status indicator indicating the data connection 500 is unavailable.

While the data connection 500 is unavailable, the client application 300 receives 510 a request from the customer to generate an order for fulfillment by the online concierge system 140. The request includes an identifier of a retailer from which the order is to be fulfilled. To allow the placement of the order with the online concierge system 140 while the data connection 500 is unavailable, the client application 300 retrieves 515 a locally stored set of items for the retailer identified by the request to generate the order. As further described above in conjunction with FIG. 4, while the data connection 500 is available, the online concierge system 140 transmits a set of items associated with each of one or more retailers to the customer client device 100, which locally stores the set of items for each of the one or more retailers.

As further described above in conjunction with FIG. 4, for a retailer, the online concierge system 140 selects items of the set based on items included in prior orders fulfilled from the retailer, and may account for items included in orders previously received from the customer of the customer client device 100 that were fulfilled from the retailer. The online concierge system 140 selects different sets of items for different retailers and transmits a set of items selected for each of one or more retailers to the customer client device 100 through the network 130 and the data connection 500. In various embodiments, the client application 300 transmits a location of the customer client device 100 or a location associated with the customer to the online concierge system 140 when the client application 300 is installed on the customer client device 100, and the online concierge system 140 selects the one or more retailers based on the location. For example, the online concierge system 140 selects retailers within a threshold distance of the location and transmits a set of items for each of the selected retailers to the customer client device 100, which locally stores each set of items in association with an identifier of a corresponding selected retailer. Locally storing a set of items associated with each of one or more retailers on the customer client device 100 allows the client application 300 to identify at least some items offered by a retailer of the one or more retailers when the data connection 500 is unavailable.

From the locally-stored set of items associated with the retailer identified by the request, the client application 300 generates one or more ordering interfaces. An ordering interface identifies items of the stored set of items and allows the customer to select items of the set of items through interaction with the ordering interface. Because the stored set of items includes a limited number of items offered by the retailer, an ordering interface allows the customer to provide a text description of an item included in the order, with the online concierge system 140 determining an item corresponding to the text description when receiving the order. Generating one or more ordering interfaces from locally-stored sets of items allows selection of items for inclusion in an order through the client application 300 when the customer client device 100 is unable to access the online concierge system 140 through the data connection 500.

Based on selections of items from one or more ordering interfaces or received text descriptions of one or more items, the client application 300 generates 520 an order for fulfillment by the retailer. The order includes an identifier of the customer, an identifier of the location for delivering items, information describing one or more items (e.g., item identifiers, text descriptions of items), and an identifier of payment information for the order. To transmit the order to the online concierge system 140 without the data connection 500, the client application 300 generates a text message including the order information, as further described above in conjunction with FIGS. 3 and 4. In various embodiments, the text message is limited to including text information. As further described above in conjunction with FIGS. 3 and 4, the text message includes different fields in some embodiments, with different fields including different information (e.g., a customer field includes the identifier of the customer, a payment field includes the payment identifier, an item field includes information identifying an item, etc.). The text message includes a tag corresponding to different information describing the order in some embodiments to identify different information about the order in the text message.

To maintain privacy of the text information describing the customer's order, the client application 300 encrypts the text message using encryption data previously received from the online concierge system 140 and stored on the customer client device 100. For example, the online concierge system 140 transmits encryption data, such as a public key associated with the online concierge system 140, to the customer client device 100 in conjunction with the sets of items associated with the one or more retailers via the data connection 500 when the data connection 500 was available. In other embodiments, the online concierge system 140 transmits the encryption data to the customer client device 100 at another time when the data connection 500 was available. The client application 300 locally stores the encryption data for subsequent use in encrypting text messages generated by the client application 100.

The client application 300 transmits 525 the encrypted text message including the order information from the customer client device 100 to the online concierge system 140 using the alternative connection 505 between the customer client device 100 and the network 130. As the alternative connection 505 transmits data using a different protocol or having a different format than the data connection 500, the alternative connection 505 is available while the data connection 500 is unavailable. For example, the alternative connection 505 is a short message service (SMS) connection to the network 300 that is limited to transmitting text data, allowing text data describing the order generated through the client application 300 to be communicated to the online concierge system 140 when the data connection 500 is unavailable. This allows the customer using the customer client device 100 to continue to place orders with the online concierge system 140 when the data connection 500 between the customer client device 100 and the network 500 is unavailable.

ADDITIONAL CONSIDERATIONS

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
at a client device comprising a processor and a computer-readable medium, the client device coupled to a network:
receiving a set of items associated with each of one or more retailers through a data connection between the network and the client device;
storing the set of items associated with each of one or more retailers in a data cache of the client device;
receiving a request to generate an order for an online concierge system identifying a retailer from a customer of the client device;
determining whether to retrieve a catalog of items for the identified retailer either from the network or from the data cache of the client device, based on an availability of the data connection between the network and the client device;
responsive to determining that the data connection between the network and the client device is unavailable, generating an order interface by retrieving the stored set of items associated with the identified retailer from the data cache of the client device, wherein the generated order interface presents the retrieved stored set of items as the catalog of items for the identified retailer;
generating the order based on information identifying items received by the ordering interface;
generating a text message including order information from the order;
encrypting the text message using encryption data stored on the client device; and transmitting the text message from the client device to the online concierge system using an alternative connection between the client device and the network than the data connection.

2. The method of claim 1, wherein the alternative connection between the client device and the network comprises a short message service connection configured to transmit text data.

3. The method of claim 1, wherein the encryption data stored in the data cache was received from the online concierge system when the data connection was available.

4. The method of claim 3, wherein the encryption data includes a public key associated with the online concierge system.

5. The method of claim 1, wherein receiving the set of items associated with each of one or more retailers through the data connection between the network and the client device comprises:
- transmitting a location of the customer to the online concierge system through the data connection; and
- receiving a set of items associated with each of one or more retailers within a threshold distance of the location through the data connection.

6. The method of claim 1, wherein receiving the set of items associated with each of one or more retailers through the data connection between the network and the client device comprises:
- receiving, prior to determining the data connection is unavailable, one or more items selected by the online concierge system based on prior orders from the customer fulfilled from the retailer.

7. The method of claim 1, wherein receiving the set of items associated with each of one or more retailers through the data connection between the network and the client device comprises:
- receiving, prior to determining the data connection is unavailable, one or more items selected by the online concierge system based on prior orders from one or more customers other than the customer fulfilled from the retailer prior to determining the data connection is unavailable.

8. The method of claim 1, wherein receiving the set of items associated with each of one or more retailers through the data connection between the network and the client device comprises:
- receiving, prior to determining the data connection is unavailable, one or more items selected by the online concierge system based on categories associated with items offered by the retailer.

9. The method of claim 1, further comprising:
- receiving, at the client device, a status message about the order from the online concierge system through the alternative connection.

10. The method of claim 9, wherein the status message was encrypted by the online concierge system, and the client device decrypts the status message using the encryption data stored on the client device.

11. A computer program product comprising a non-transitory computer readable storage medium having instruction encoded thereon that, when executed by a processor, cause the processor to:
- receive a set of items associated with each of one or more retailers at a client device through a data connection between a network and the client device;
- store the set of items associated with each of one or more retailers in a data cache of the client device;
- receive a request to generate an order for an online concierge system identifying a retailer from a customer of the client device;
- determining whether to retrieve a catalog of items for the identified retailer either from the network or from the data cache of the client device, based on an availability of the data connection between the network and the client device;
- responsive to determining that the data connection between the network and the client device is unavailable, generate an order interface by retrieving the based on a stored set of items associated with the identified retailer from the data cache of the client device, wherein the generated order interface presents the retrieved stored set of items as the catalog of items for the identified retailer;
- generate the order based on information identifying items received by the ordering interface;
- generate a text message including order information from the order;
- encrypt the text message using encryption data stored on the client device; and
- transmit the text message from the client device to the online concierge system using an alternative connection between the client device and the network than the data connection.

12. The computer program product of claim 11, wherein the alternative connection between the client device and the network comprises a short message service connection configured to transmit text data.

13. The computer program product of claim 11, wherein the encryption data stored in the data cache was received from the online concierge system when the data connection was available.

14. The computer program product of claim 13, wherein the encryption data includes a public key associated with the online concierge system.

15. The computer program product of claim 11, wherein receiving the set of items associated with each of one or more retailers through the data connection between the network and the client device comprises:
- transmit a location of the customer to the online concierge system through the data connection; and
- receive a set of items associated with each of one or more retailers within a threshold distance of the location through the data connection.

16. The computer program product of claim 11, wherein receiving the set of items associated with each of one or more retailers through the data connection between the network and the client device comprises:
- receiving, prior to determining the data connection is unavailable, one or more items selected by the online concierge system based on prior orders from the customer fulfilled from the retailer.

17. The computer program product of claim 11, wherein receiving the set of items associated with each of one or more retailers through the data connection between the network and the client device comprises:
- receiving, prior to determining the data connection is unavailable, one or more items selected by the online concierge system based on prior orders from one or more customers other than the customer fulfilled from the retailer prior to determining the data connection is unavailable.

18. The computer program product of claim 11, wherein receiving the set of items associated with each of one or more retailers through the data connection between the network and the client device comprises:

receiving, prior to determining the data connection is unavailable, one or more items selected by the online concierge system based on categories associated with items offered by the retailer.

19. The computer program product of claim 11, wherein the non-transitory computer readable storage medium further has instructions encoded thereon that, when executed by the processor, cause the processor to:

receive, at the client device, a status message about the order from the online concierge system through the alternative connection.

20. A computer system comprising:

a processor; and a non-transitory computer-readable storage medium having instructions that, when executed by the processor, cause the computer system to perform steps comprising:

receiving a set of items associated with each of one or more retailers through a data connection between a network and a client device;

storing the set of items associated with each of one or more retailers in a data cache of the client device;

receiving a request to generate an order for an online concierge system identifying a retailer from a customer of the client device;

determining whether to retrieve a catalog of items for the identified retailer either from the network or from the data cache of the client device, based on an availability of the data connection between the network and the client device;

responsive to determining that the data connection between the network and the client device is unavailable, generating an order interface by retrieving the stored set of items associated with the identified retailer from the data cache of the client device, wherein the generated order interface presents the retrieved stored set of items as the catalog of items for the identified retailer;

generating a text message including order information from the order;

encrypting the text message using encryption data stored on the client device; and transmitting the text message from the client device to the online concierge system using an alternative connection between the client device and the network than the data connection.

* * * * *